(12) United States Patent
Krupa et al.

(10) Patent No.: US 10,260,652 B2
(45) Date of Patent: Apr. 16, 2019

(54) AUTOMATIC WATER SHUT-OFF DEVICE

(71) Applicant: Apurk Ltd., Bolton (CA)

(72) Inventors: Adam Krupa, Bolton (CA); Marek Krupa, Brampton (CA); Karol Krupa, Toronto (CA); Robert Dickie, King (CA)

(73) Assignee: Apurk Ltd., Bolton, Ontario (CA)

(*) Notice: Subject to any disclaimer, the term of this patent is extended or adjusted under 35 U.S.C. 154(b) by 0 days.

(21) Appl. No.: 15/423,643

(22) Filed: Feb. 3, 2017

(65) Prior Publication Data
US 2017/0219116 A1  Aug. 3, 2017

Related U.S. Application Data

(60) Provisional application No. 62/290,532, filed on Feb. 3, 2016.

(51) Int. Cl.
  *F16K 33/00* (2006.01)
  *F16K 31/20* (2006.01)
  (Continued)

(52) U.S. Cl.
  CPC ............. *F16K 31/20* (2013.01); *F16K 1/126* (2013.01); *F16K 21/16* (2013.01); *F16K 21/185* (2013.01);
  (Continued)

(58) Field of Classification Search
  CPC ...... F16K 31/001; F16K 21/16; F16K 31/265; F16K 33/00
  (Continued)

(56) References Cited

U.S. PATENT DOCUMENTS 2,362,747 A * 11/1944 Duke .................... E02B 13/02
                                                        405/41
2,512,176 A *  6/1950 Shaffer ................ F16K 31/265
                                                        137/390

(Continued)

*Primary Examiner* — Marina A Tietjen
*Assistant Examiner* — Paul J Gray
(74) *Attorney, Agent, or Firm* — Rowand LLP (57) ABSTRACT

A water shut-off device is disclosed. The water shut-off device has an inlet port and an outlet port. The water shut-off device includes: a housing fluidly connected to the inlet port and the outlet port, the housing having an opening at its upper end and including: a valve for switching the device between an open configuration and a closed configuration, the valve permitting flow of water through the device in the open configuration and prohibiting flow of water through the device in the closed configuration; a gear wheel secured to the housing and operatively coupled to the valve, the valve being actuated by rotations of the gear wheel; and an anchor in mechanical communication with the gear wheel, the anchor including: a container for receiving water flowing through the opening; and at least one pallet connected to the container, the at least one pallet being configured to catch against one or more teeth of the gear wheel, the anchor being rotatably mounted at a fixed pivot in the housing such that the anchor swings about the pivot as water collects in the container, the swinging of the anchor about the pivot causing the at least one pallet to alternately catch and release a tooth of the gear wheel, thereby causing the gear wheel to rotate in a first direction.

8 Claims, 8 Drawing Sheets

(51) Int. Cl.
*F16K 1/12* (2006.01)
*F16K 21/18* (2006.01)
*F16K 21/16* (2006.01)
*F16K 27/02* (2006.01)
*F16K 31/53* (2006.01)
*F16K 31/52* (2006.01)

(52) U.S. Cl.
CPC .............. *F16K 27/02* (2013.01); *F16K 31/52* (2013.01); *F16K 31/53* (2013.01); *F16K 33/00* (2013.01)

(58) Field of Classification Search
USPC ........................................ 137/78.2, 78.3, 428
See application file for complete search history.

(56) References Cited

U.S. PATENT DOCUMENTS

| | | | | |
|---|---|---|---|---|
| 3,422,833 | A * | 1/1969 | Kitrilakis | B05B 12/12 137/78.2 |
| 3,712,327 | A * | 1/1973 | Pagenkopf | F17D 5/00 137/78.2 |
| 5,072,751 | A * | 12/1991 | Lin | F16K 31/26 137/429 |
| 5,213,130 | A * | 5/1993 | Al-Hamlan | F16K 31/20 137/122 |
| 6,782,909 | B1 * | 8/2004 | Ragless | F16K 31/001 137/78.3 |
| 2002/0124880 | A1 * | 9/2002 | Tanikawa | A01G 27/003 137/78.3 |

* cited by examiner

AUTOMATIC WATER SHUT-OFF DEVICE

CROSS-REFERENCE TO RELATED APPLICATIONS

The present application claims priority to U.S. Provisional Patent Application Ser. No. 62/290,532, filed on Feb. 3, 2016, the contents of which are hereby incorporated by reference.

TECHNICAL FIELD

The present disclosure relates to water flow control devices and, in particular, to water shut-off devices for controlling the flow of water during irrigation.

BACKGROUND

Various different types of devices may be used for controlling water flow during irrigation. One example device type is a mechanical timer valve. A mechanical timer valve allows for automatic shut-off of water flow in the valve after the expiration of a user-defined period of time. Such valves rely on measuring the length of time of irrigation in determining when and how to regulate the flow of water through the valve. Use of a mechanical timer valve can obviate the need for manual operation and constant supervision of a water supply source.

It would be advantageous to provide different types of devices which are capable of using parameters other than the duration of irrigation for automatically regulating water flow.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a water shut-off device for controlling water flow. The water shut-off device includes an inlet port, an outlet port and a housing which is fluidly connected to the inlet port and the outlet port. The housing has an opening at its upper end. The housing includes a valve for switching the device between an open configuration and a closed configuration, where the valve permits flow of water through the device in the open configuration and prohibits flow of water through the device in the closed configuration. The housing also includes a gear wheel which is operatively coupled to the valve, such that the valve may be actuated by rotations of the gear wheel. The housing also includes an anchor. The anchor includes a container for receiving water flowing through the opening and at least one pallet attached to the container, where the at least one pallet is configured to catch against one or more teeth of the gear wheel. The anchor is configured to swing about a fixed pivot in the housing as water collects in the container. The swinging of the anchor about the pivot causes the at least one pallet to alternately catch and release a tooth of the gear wheel to cause the gear wheel to rotate in a first direction.

In another aspect, the present disclosure describes a water shut-off device with a handle. The water shut-off device includes an inlet port, an outlet port and a housing. The housing includes a water collection chamber at an upper end of the housing for collecting water flowing through a first opening of the housing. The housing also includes a water flow channel at a lower end of the housing, the water flow channel fluidly connecting the inlet port and the outlet port. The water flow channel also includes one or more interior sidewalls that define a partition within the water flow channel, the partition defining an aperture for allowing passage of water between the ports. The housing includes a stem which extends longitudinally from the water collection chamber into the water flow channel and through the aperture in the partition. The stem has a handle at a first end and a disc at a second end. The housing also includes a stem controller which uses water that accumulates in the water collection chamber to cause an upward movement of the stem and to bring the disc into contact with the partition to seal the aperture.

In yet another aspect, the present disclosure describes a water shut-off device for use with a sprinkler. The water shut-off device includes an inlet port, an outlet port and a housing. The housing includes a water collection container having a top opening, where the water collection container is configured to collect water discharged from a sprinkler through the top opening. The housing also includes a water flow channel which fluidly connects the inlet port and the outlet port. The housing further includes a valve configured to regulate flow of water in the water flow channel and a valve controller for switching the valve to a closed configuration when a quantity of water collected in the water collection container equals or exceeds a threshold amount.

Other example embodiments of the present disclosure will be apparent to those of ordinary skill in the art from a review of the following detailed descriptions in conjunction with the drawings.

The present disclosure describes an automatic water shut-off device which relies on measurements of the quantity of water collected in the device in determining when and how to shut off the flow of water through the device. In particular, rather than relying on an inflexible timer mechanism, the present solution attempts to gauge the quantity of water that is actually discharged by the irrigation system and use the measurements to determine when to automatically halt the irrigation. The present solution also enables a user to control, via the device, how much water is desired to be distributed during irrigation before automatic shut-off.

In at least some embodiments, the water shut-off device proposed in the present application includes a valve controller for switching a valve in the device between an open configuration and a closed configuration, based on the quantity of water collected in the device. The valve controller may switch the valve to the closed configuration when the quantity of water collected equals or exceeds a threshold amount. In some cases, the valve controller may employ an anchor escapement which is driven by the weight of water that is collected in the device. The weight of water serves as a proxy for the quantity of water collecting in the device, and the amount of movement of one or more mechanical components of the device caused by the anchor escapement can indicate when to shut off the flow of water. In some other cases, the valve controller may employ a movable stem positioned inside the housing of the device. A stopper may be affixed to one end of the movable stem. As water collects in the device, the collected water displaces the stem in a predetermined direction and causes the stopper to block the flow of water through the device.

Anchor Escapement Mechanism

Figure 1:
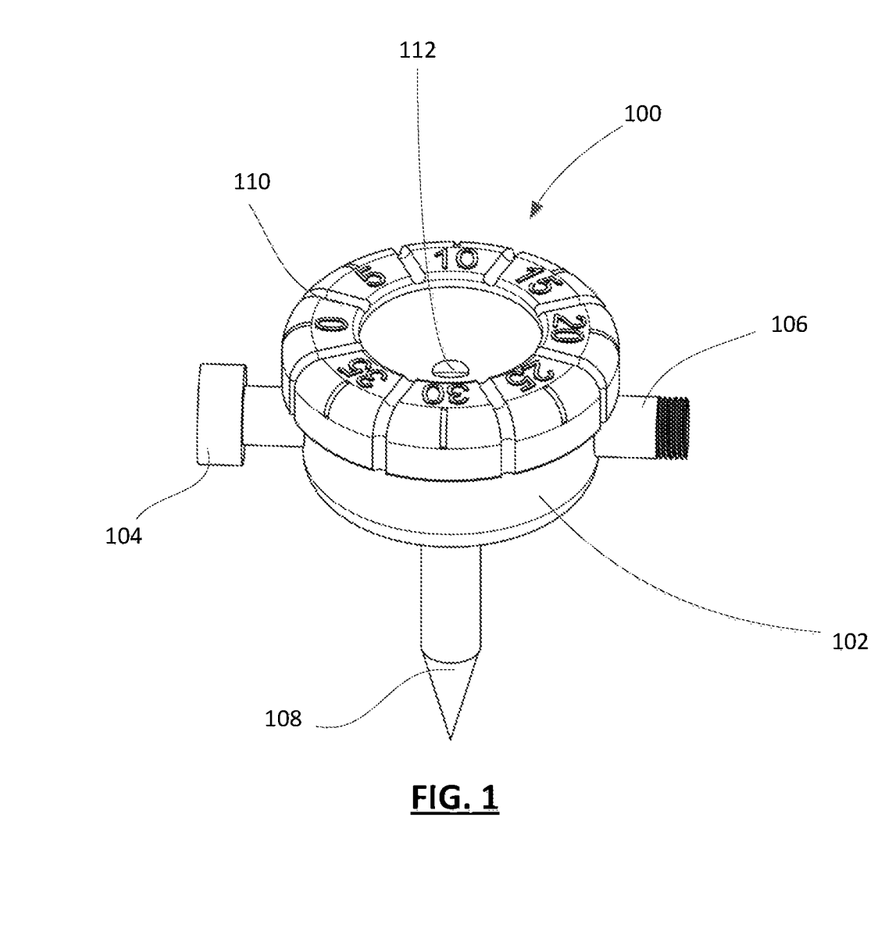
FIG. 1 shows a perspective view of an example water shut-off device, in accordance with example embodiments of the present disclosure.

Reference is first made to FIG. 1, which shows a perspective view of an example water shut-off device 100. The water shut-off device 100 includes a housing 102. In some cases, as in the example of FIG. 1, the housing 102 is generally cylindrical. The housing 102 is adapted to hold components of the water shut-off device 100 that regulate the flow of water through the water shut-off device 100. The various components of the water shut-off device 100 may be contained in the interior (e.g. internal chamber) of the housing 102. The housing 102 has an opening at its upper end. For example, in at least some embodiments, the housing 102 may have an open mouth at its upper end. In other words, the housing 102 may have an open top end. In some other embodiments, the housing 102 may have a top surface or cover which defines an opening. For example, the top surface of the housing 102 may form a closed top end and the opening may be an aperture that is disposed on the top surface. As shown in the example of FIG. 1, the opening 112 on the top surface or cover of the housing 102 allows water to flow into the interior of the housing 102 through the upper end. For example, if the water shut-off device 100 is used in sprinkler irrigation, the water shut-off device 100 may be positioned relative to the sprinkler such that at least some of the water discharged from the sprinkler falls on the water shut-off device 100 and is collected in the interior of the housing 102. In particular, the water shut-off device 100 may be placed at a location where some of the water sprayed into the air through a sprinkler may be received on the top surface of the water shut-off device 100 and allowed to flow into the housing 102. The top surface or cover of the housing 102 may be sloped to guide the flow of water through the opening 112 and into the housing 102.

Figure 10:
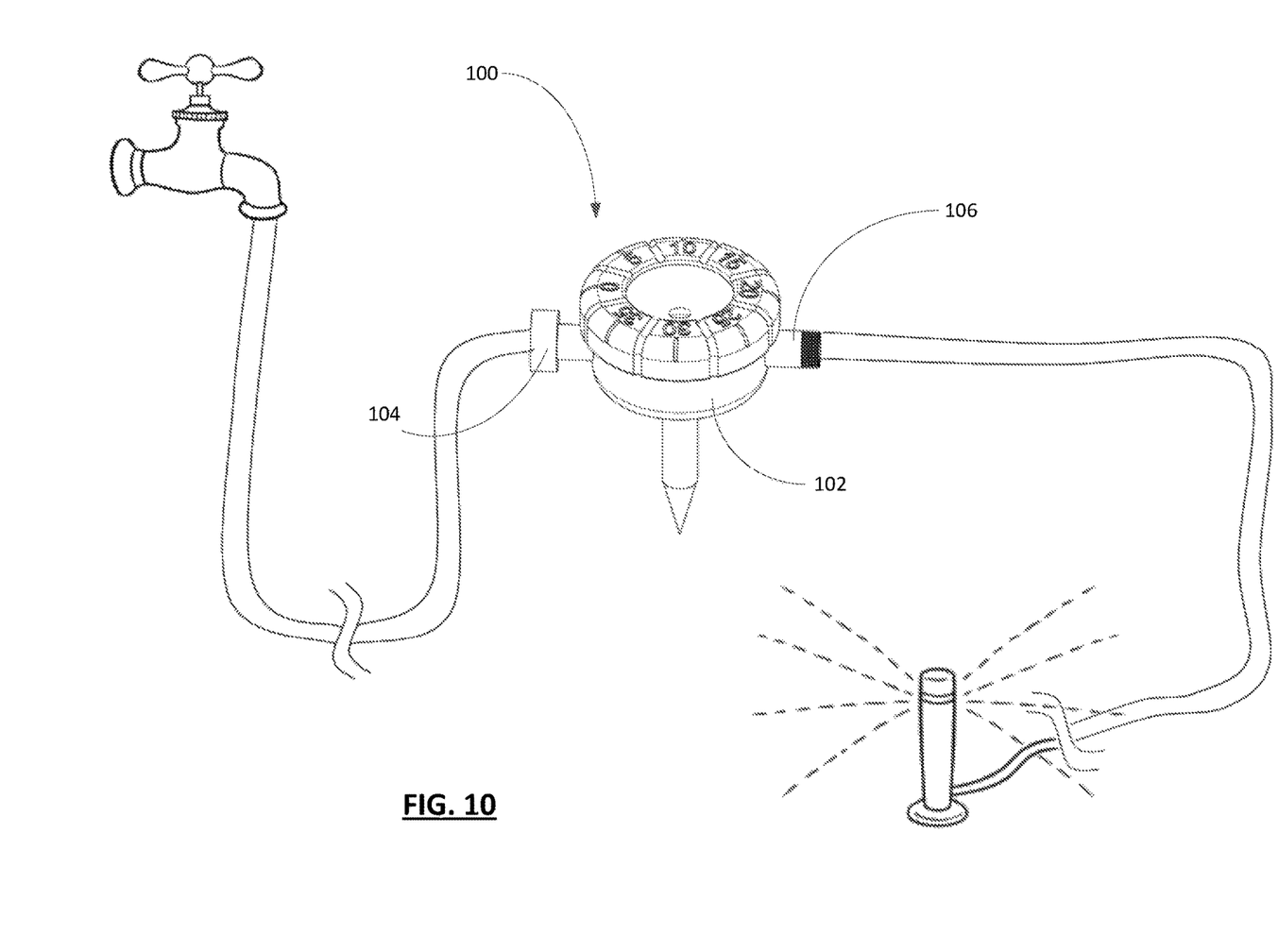
FIG. 10 shows an example configuration for operating the water shut-off device of FIG. 1.

The water shut-off device 100 also has an inlet port 104 and an outlet port 106. As shown in FIG. 10, the inlet port 104 may be operatively connected to a water supply source, such as a faucet, and the outlet port 106 may be connected to a sprinkler or spray. The inlet port 104 and the outlet port 106 may be adapted to receive separate hose sections, to connect to a water supply source and to discharge water flowing through the water shut-off device 100, respectively. In some embodiments, the ports 104 and 106 may also accommodate fitting with one or more hose connectors. For example, portions of one or both of the ports 104 and 106 may be threaded to facilitate engagement with hose connectors.

The housing 102 is fluidly connected to the inlet port 104 and the outlet port 106. In at least some embodiments, the housing 102 may include a channel which is in fluid connection with ports 104 and 106. For example, a channel may be defined in the interior of the housing 102 such that it extends between the inlet port 104 and the outlet port 106 inside the housing 102, providing a passage for flow of water between the ports. As shown in FIG. 1, in some embodiments, the housing 102 and the ports 104 and 106 may be integrally formed. For example, the ports 104 and 106 may define hollow, tubular sections, such as pipes, that extend away from the housing 102 in generally opposite directions. The ports 104 and 106 may be aligned with each other such that the channel defines a direct passageway that extends between the ports.

The water shut-off device 100 may also include an installation spike 108. The installation spike 108 may be integrally formed with the housing 102 or it may be an add-on component that is configured to be secured to the housing 102. For example, the installation spike 108 may be disposed on the bottom surface of the housing 102 such that it extends vertically away from the housing 102. In some embodiments, the installation spike 108 may be configured to be inserted into soil. The installation spike 108 can be used to install the water shut-off device 100 directly onto a ground surface. The bottom end of the installation spike 108 may comprise an angled wall to enable insertion into the ground. For example, the angled wall of the bottom end of the installation spike 108 may comprise an inverted cone. The shape of the inverted cone, with a sharp vertex and an angled wall of the bottom end which tapers smoothly from the vertex, may make the spike 108 better suited for insertion into the ground.

In at least some embodiments, the water shut-off device 100 includes a dial knob 110. The dial knob 110 may be coupled to the housing 102. In the example of FIG. 1, the dial knob 110 is generally cylindrical and is mounted on top of the housing 102. In particular, the dial knob 110 may form a cover for the upper end of the housing 102. The dial knob 110 may define an opening which allows water received from irrigation sprinklers to flow through into the interior of the housing 102. In at least some embodiments, the dial knob 110 is rotatable about a central axis of the housing 102. The dial knob 110 can be used to manually indicate an amount of water that is to be received in the housing 102 before triggering automatic shut-off of water flow between the ports 104 and 106. For example, the dial knob 110 may contain a plurality of markings which correspond to various volumes of water. A user can turn the dial knob 110 to specify a desired value and, in turn, the valve may be configured to automatically shut-off water flow when the user-specified volume of water is received in the housing 102. The operation of the dial knob 110 for controlling the water shut-off device 100 will be described in greater detail below.

Figure 2:
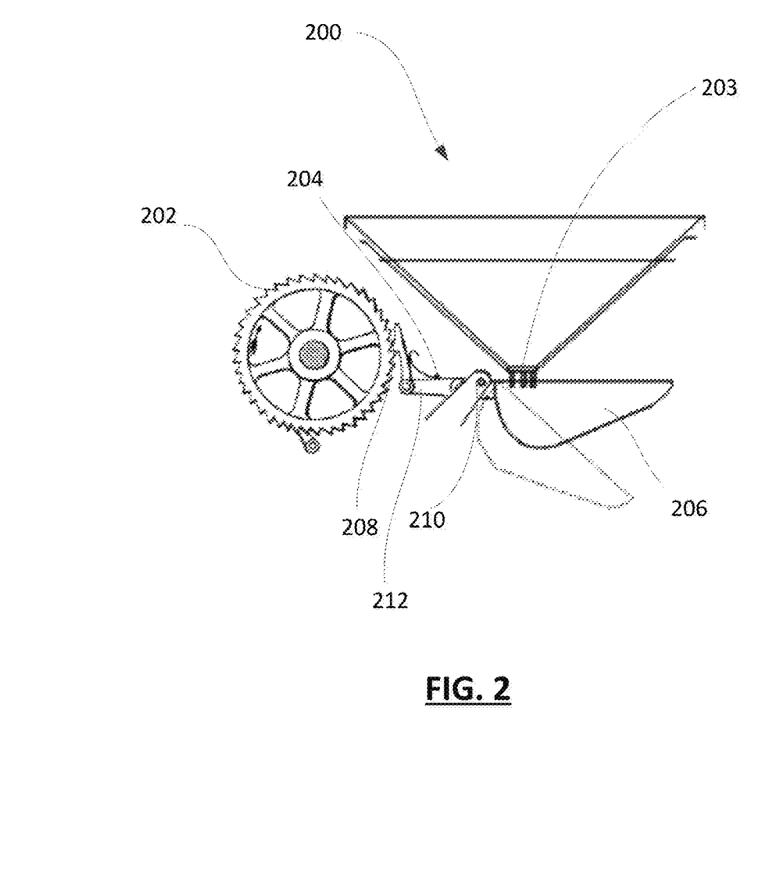
FIG. 2 diagrammatically shows one example system for automatically controlling the water shut-off device of FIG. 1.

Reference is now made to FIG. 2, which diagrammatically shows one example system 200 for automatically controlling a water shut-off device, such as the water shut-off device 100 of FIG. 1. The components shown in FIG. 2 are contained in a housing, such as the housing 102 of FIG. 1.

The system 200 includes a valve 201 (not shown in FIG. 2). The valve 201 causes the water shut-off device 100 to switch between an open configuration and a closed configuration. In an open configuration, the valve 201 permits flow of water through the water shut-off device 100, for example, between an inlet port and an outlet port. In a closed configuration, the valve 201 prohibits flow of water through the water shut-off device 100. For example, the valve may cause a water passage between the inlet port and the outlet port to be partially or completely blocked.

The system 200 also includes a gear wheel 202. The gear wheel 202 has a plurality of teeth on its perimeter. The gear wheel 202 is secured to the housing as to permit rotation of the gear wheel 202 about a fixed or movable axis of revolution. Additionally, the gear wheel 202 is operatively coupled to the valve 201. In particular, the valve 201 may be actuated by rotations of the gear wheel 202. For example, in some embodiments, the valve 201 may comprise one or more gears, and the gear wheel 202 may be configured to mesh with the gears of the valve 201. In this way, a rotation of the gear wheel 202 may transmit rotary motion to the gears of the valve 201. As another example, the gear wheel 202 may be part of a wheel-and-axle configuration. The gear wheel 202 may be affixed to a shaft, and a rotation of the gear wheel 202 may cause the shaft to drive one or more components of the valve 201. It will be appreciated that other techniques for actuating the valve 201 by converting the rotational motion of the gear wheel 202 may be available.

The system 200 includes an anchor 204. The anchor 204 is rotatably mounted at a fixed pivot 210 in the housing. The anchor 204 includes a container 206 for receiving water that flows through an opening 203 at an upper end of the housing. For example, in some embodiments, the container 206 may be a bucket having a fixed volume. The anchor 204 also includes at least one pallet 208 that is connected to the container 206. As shown in FIG. 2, the pallet 208 makes contact with the gear wheel 202 when the anchor 204 is in a resting position. More specifically, the pallet 208 is configured to mesh with the gear wheel 202 such that the pallet 208 catches against one or more teeth of the gear wheel 202. In the resting position of the anchor 204, the pallet 208 may catch against a tooth of the gear wheel 202 and prevent the gear wheel 202 from freely rotating about the pivot 210.

In some embodiments, the anchor 204 may also include an anchor arm 212. The anchor arm 212 may be used to connect the container 206 and the at least one pallet 208. For example, the container 206 may be rigidly affixed to a first end of the anchor arm 212 and the pallet 208 may be coupled to a second end of the anchor arm 212, the first and second ends being opposite to each other. In at least some embodiments, the pallet 208 is hingedly attached to the second end of the anchor arm 212. That is, the pallet 208 may be affixed to the second end of the anchor arm 212 such that it is rotatable about a fixed hinge on the anchor arm 212. As in the example shown in FIG. 2, the anchor arm 212 may be rotatably attached to the pivot 210 such that the anchor arm 212 is the portion of the anchor 204 which rotates about the pivot 210.

The anchor 204 may be mounted in the housing such that water flowing through the opening 203 is collected in the container 206. In particular, at least a part of the receiving portion of the container 206 may vertically align with the opening 203 in the housing when the anchor 204 is in a resting position. As described above with reference to FIG. 1, the water shut-off device may operate by automatically causing a shut-off based on the volume of water received in the housing naturally (e.g. rain water) and/or from an irrigation source, such as a sprinkler or spray. Water from the irrigation source may flow into the housing through its top end, via an opening such as the opening 203. As water collects in the container 206, the weight of the collected water may cause the anchor 204 to swing about the pivot 210. For example, the anchor 204 may be configured to allow at least some water collected in the container 206 to flow out of the container 206 such that the inflow and outflow of water cause the anchor 204 to swing in alternating directions about the pivot 210.

In the system 200 of FIG. 2, as water collects in the container 206, the weight of the water may cause the container 206 to tilt and the anchor arm 212 (which is rigidly coupled to the container 206) to rotate about the pivot 210 in a first direction. When the container 206 tilts by more than a threshold amount, some of the water collected in the container 206 may spill out, causing the container 206 and anchor arm 212 to rotate back in a second direction opposite to the first direction. For example, the bottom surface of the container 206 may be angled between a first and second end of the container 206 such that when the container 206 tilts by more than a threshold amount, some of the water flows out of the first end of the container 206. Alternatively, the container 206 may have different mechanisms for allowing water to leave the container 206 when a threshold level of water is collected in the container 206. For example, one or more sidewalls or the bottom surface of the container 206 may define an aperture (not shown in FIG. 2) that is covered by a hinged cover, the cover being configured to swing open when a predetermined quantity of water is collected by the container 206, allowing some of the collected water to flow out through the aperture. Other techniques for allowing the outflow of water from the container 206 are contemplated by the present disclosure. In this way, the anchor 204 swings about the pivot 210 in alternating directions due to the momentum of water flowing into and out of the container 206.

The swinging of the anchor 204 about the pivot 210 causes rotational motion in the gear wheel 202. In particular, as the anchor 204 swings about the pivot 210 in alternating directions, the swinging causes the at least one pallet 208 to alternately release and catch a tooth of the gear wheel 202, thereby rotating the gear wheel 202. The pallet 208 is configured to release one tooth and catch against an adjacent tooth, repeating the pattern of release and catch as the anchor 204 swings about the pivot 210 and advancing the gear wheel 202 in a first direction (i.e. clockwise or counter-clockwise direction) of rotation.

As noted earlier, the water shut-off device relies on using measurements of the quantity of water which collects in the housing in determining when to automatically shut-off water flow through the water shut-off device. The water shut-off device implements one or more techniques for obtaining measurements of the amount of collected water. In some embodiments, the gear wheel 202 may be calibrated such that the amount of rotation of the gear wheel 202 indicates the volume of water that was received in the container 206. For example, the number of teeth on the gear wheel 202 which were advanced by the swinging of the anchor 204 may indicate the number of times the container 206 tilted, which may, in turn, allow the total volume of received water to be derived. When the volume of water received in the housing equals a value defined by a user (e.g. by specifying a quantity via a dial knob, such as the dial knob 110 of FIG. 1), the valve 201 may cause the water shut-off device to be automatically shut-off.

Figure 3:
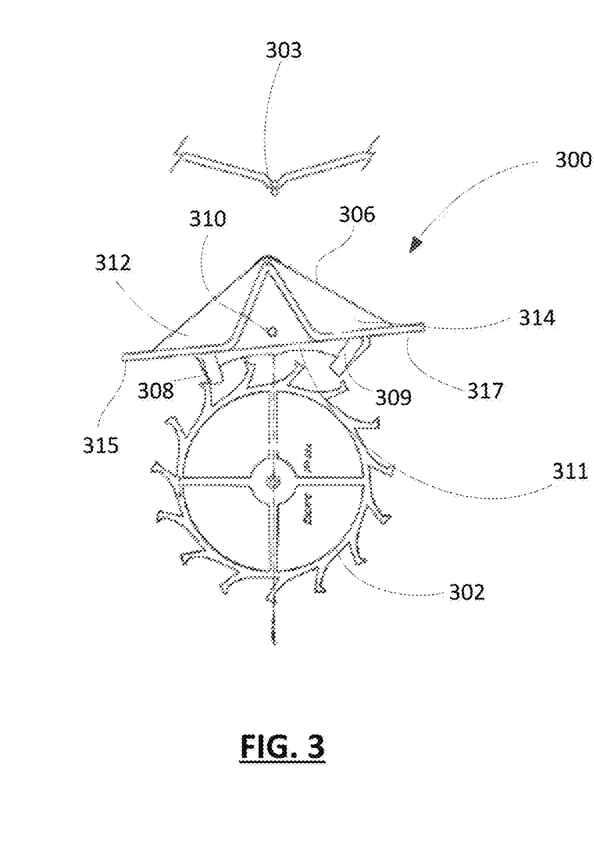
FIG. 3 diagrammatically shows another example system for automatically controlling the water shut-off device of FIG. 1.

Reference is now made to FIG. 3, which diagrammatically shows another example system 300 for automatically controlling a water shut-off device, such as the water shut-off device 100 of FIG. 1. The components shown in FIG. 3 are contained in a housing, such as the housing 102 of FIG. 1.

Similar to system 200, the system 300 includes a valve 301 (not shown), a gear wheel 302 and an anchor 304. The valve 301 can switch the water shut-off device between an open configuration and a closed configuration. The gear wheel 302 is secured to the housing and is operatively coupled to the valve, such that the valve may be actuated by rotations of the gear wheel 302.

In system 300, the anchor 304 is rotatably mounted at a fixed pivot 310, where the pivot 310 is positioned above the gear wheel 302 in the housing. In particular, at least part of the anchor 304 is configured to swing about the pivot 310 and above the gear wheel 302. The anchor 304 includes a container 306 and two pallets 308 and 309 that are connected to the container 306. As shown in FIG. 3, the pallets 308 and 309 extend away from the bottom exterior surface 311 of the container 306 and are positioned in spaced relation to each other. The pallets are positioned on the bottom exterior surface 311 such that the pallet 308 is closer to a first end 315 of the anchor 304 than is the pallet 309, and the pallet 309 is closer to a second end 317 of the anchor 304 than is the first pallet 308, the first end 315 of the anchor 304 being opposite to the second end 317. In some embodiments, at least one of the pallets 308 and 309 extends away from the bottom exterior surface 311 at an angle. For example, as in FIG. 3, the pallets 308 and 309 may each extend at an angle to the bottom exterior surface 311 such that they are both slanted towards each other. That is, the pallet 308 may extend in a direction away from the first end 315 and the pallet 309 may extend in a direction away from the second end 317. In some other embodiments, the pallets 308 and 309 may be generally perpendicular to the bottom exterior surface 311.

When the anchor 304 is in a resting position, at least one of the pallets 308 and 309 makes contact with a tooth of the gear wheel 302. In particular, when the anchor 304 is mounted at the pivot 310 in the housing, one of the pallets 308 and 309 catches against a tooth of the gear wheel 302. The tooth rests against the pallet, without pushing it, and prevents the gear wheel 302 from undergoing rotation.

As water flows through the opening 303 in the housing, the water is received in the container 306. The weight of water collecting in the container 306 may cause the anchor 304 to swing about the pivot 310. In at least some embodiments, the container 306 includes two non-overlapping compartments. As shown in FIG. 3, the container 306 may include a first compartment 312 and a second compartment 314, both compartments being configured to independently receive water flowing through the opening 303. For example, the container 306 may have an open top or a cover defining separate openings to each respective compartment 312 and 314. In some cases, the container 306 includes one or more partitions which define the first compartment 312 and the second compartment 314. For example, the container 306 may include interior walls which demarcate a boundary between the first compartment 312 and the second compartment 314 and which guide the flow of water into the respective compartments. Such interior walls may prevent the flow of any water between the two compartments of the container 306. The compartments may be positioned within the anchor 304 such that, as the anchor 304 swings about the pivot 310, water flowing through the opening 303 flows alternately into the first compartment 312 and the second compartment 314.

In at least some embodiments, the anchor 304 may be caused to swing about the pivot 310 as a result of the difference between the weight of water which collects in the first and second compartments, respectively. An example scenario is illustrative. As water from an irrigation source (e.g. sprinkler, spray, etc.) flows through the opening 303, the water may begin to collect in the second compartment 314 (for example, by entering through the opening to the second compartment 314). The weight of the water collecting in the second compartment 314 increases and causes the second end 317 of the anchor 304 to gradually tilt until the opening 303 aligns with an opening to the first compartment 312. Water may then be received in the first compartment 312 until such time that the difference in weight between the water collecting in the first compartment 312 and the second compartment 314 causes the first end 315 of the anchor 304 to tilt. This pattern of alternating tilting can cause the anchor 304 to swing about the pivot 310. In some embodiments, the compartments 312 and 314 may be configured to allow some of the collected water to flow out of the respective compartments. For example, as water flows into and collects in one of the compartments 312 and 314, the other of the compartments may allow drainage of some of the water collected in that compartment. In this way, the difference in weight of the water collecting in the respective compartments may be reduced at a faster rate. The swinging of the anchor 304 resulting from changes in the weight of collected water in the respective compartments causes the pallets 308 and 309 to alternately release and catch a respective tooth of the gear wheel, causing the gear wheel 302 to rotate in a first direction.

The systems 200 and 300 are examples of mechanisms that enable the weight of irrigation water collecting in the housing 102 (of FIG. 1) to drive one or more mechanical components of the water shut-off device 100 to block the flow of water through the water shut-off device 100. A user can control the operation of the water shut-off device 100 by indicating a desired quantity of water that should be collected in the housing 102 before water flow is shut off. For example, the dial knob 110 of FIG. 1 may be used to specify a desired quantity of irrigation water to collect. The dial knob 110 may be coupled to the housing 102 of the water shut-off device 100 such that the dial knob 110 can be rotated about a central axis, where the degree of rotation corresponds to a user's desired input.

In at least some embodiments, the systems 200 and 300 may comprise a spring mechanism connected to the valve of the water shut-off device 100. This spring mechanism may be configured to provide the force required to close the valve of the water shut-off device 100. In particular, the dial knob 110 of the water shut-off device 100 can be used to impart potential energy to the spring mechanism. For example, the spring mechanism may comprise a coiled spring, and rotary motion of the dial knob 110 may cause the coiled spring to be compressed. That is, when a user turns the dial knob 110, the coiled spring may be compressed. In some cases, the amount of compression of the coiled spring may correspond to the degree of rotation of the dial knob 110. As irrigation water collects in the housing 102, the gear wheel of systems 200 and 300, respectively, is caused to rotate. When the desired quantity of water has been collected, the gear wheel will have rotated to such an extent as to cause the compressed spring to be released, allowing the spring to extend to its natural length. For example, the systems 200 and 300 may include a compressor mechanism which maintains the coil spring compressed after a user winds the dial knob 110. The advancing of the gear wheel due to the collection of water may then cause the compressor mechanism to release (either gradually or immediately upon exceeding a threshold level) the spring. The restoring force resulting from the release of the spring from its compressed position can cause the valve to be closed.

Buoyance-Based Valve Control

Figure 4:
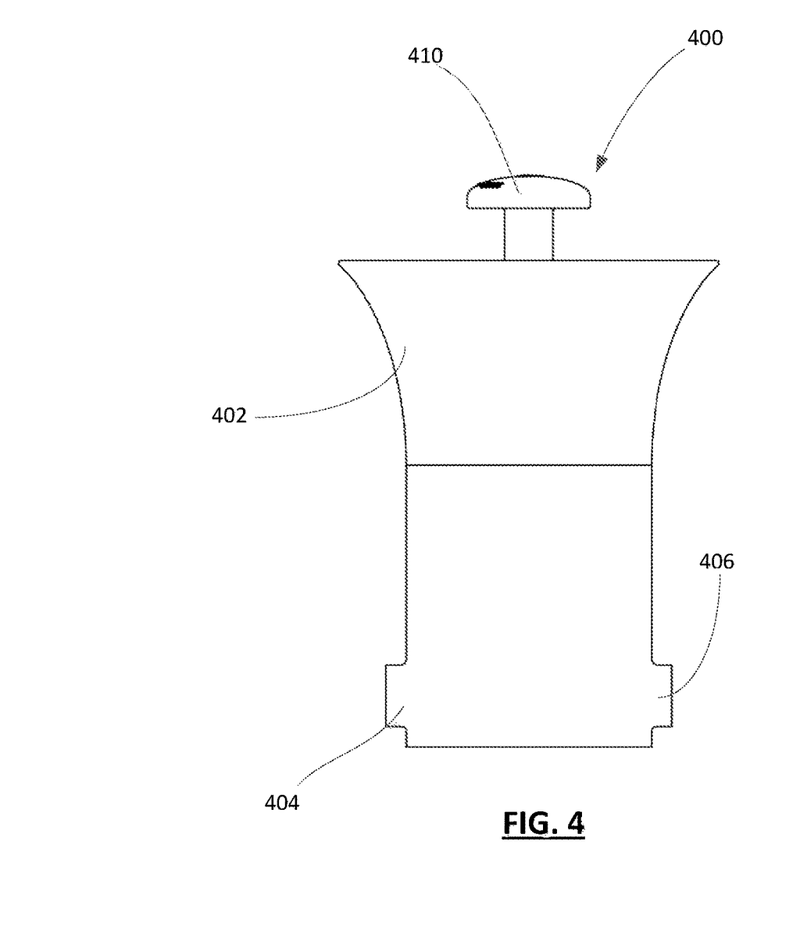
FIG. 4 shows a side view of another example water shut-off device.

Reference is now made to FIG. 4, which shows a side view of a water shut-off device 400. The water shut-off device 400 includes a housing 402. The housing 402 is generally cylindrical. In some embodiments, the upper end of the housing 402 may be flared outward, as shown in the example of FIG. 4. The water shut-off device 400 has an inlet port 404 and an outlet port 406. Each of the ports may be adapted to receive or connect with separate hose sections. The water shut-off device 400 also includes a handle 410 which protrudes out of the top end of the housing 402. The handle 410 will be described in greater detail below.

Figure 5:
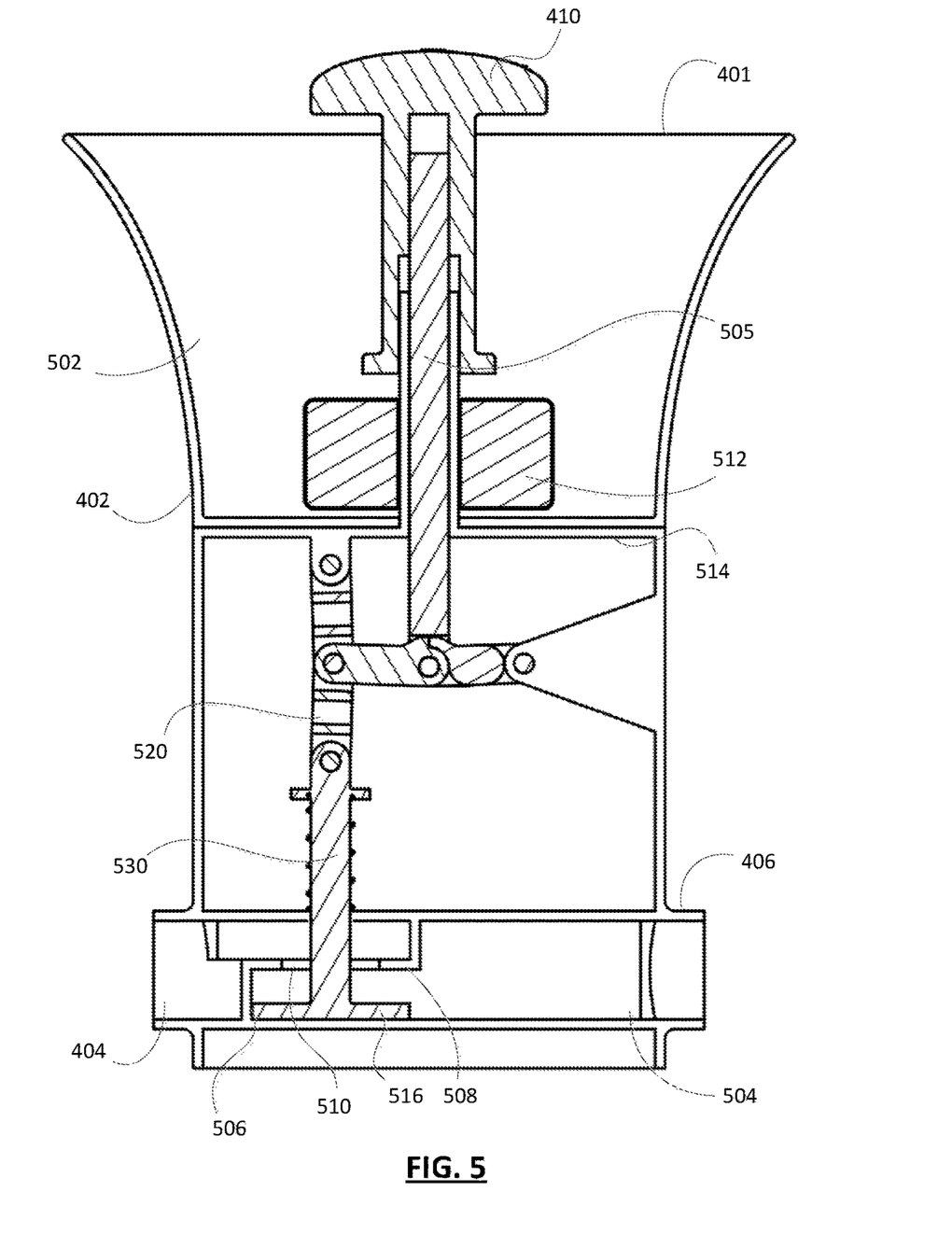
FIG. 5 shows a side cross-sectional view of the water shut-off device of FIG. 4 when the device is in an open configuration.
Figure 6:
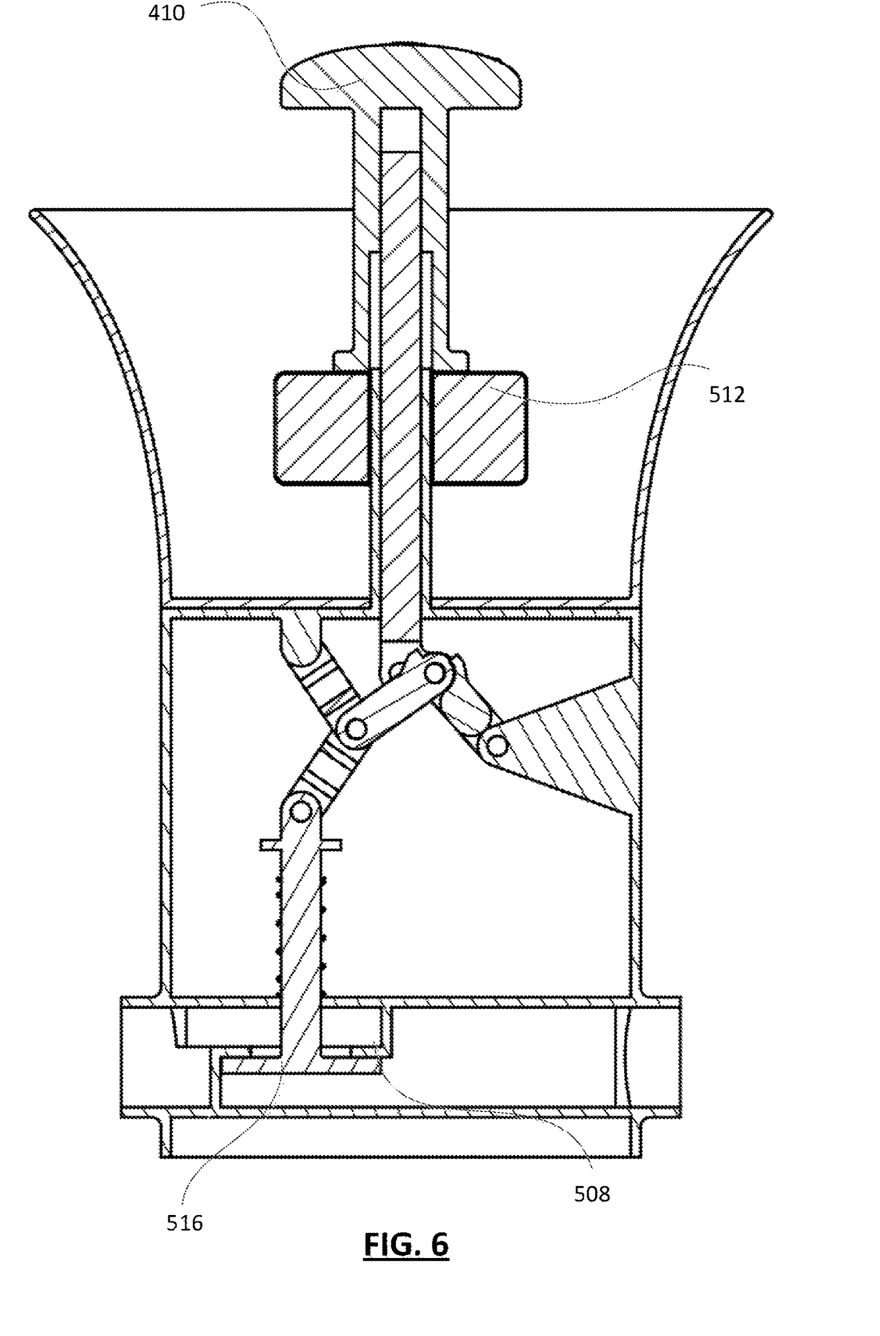
FIG. 6 shows a side cross-sectional view of the water shut-off device of FIG. 4 when the device is in a closed configuration.

Reference is now made to FIGS. 5 and 6, which show side cross-sectional views of the water shut-off device 400. The housing 402 has an open top end. In particular, the housing 402 has an open mouth 401 at its upper end. The housing 402 includes a water collection chamber 502. The water collection chamber 502 receives and collects water flowing through the open top end of the housing 402. In at least some embodiments, the water collection chamber 502 may be defined at an upper end of the housing 402. For example, the housing 402 may include a platform which serves as a horizontal partition dividing the housing 402 into two vertically adjacent compartments. The upper compartment defined by the platform may be the water collection chamber 502. That is, the platform is the bottom surface 514 of the water collection chamber 502. In particular, water flowing into the housing 402 through its open mouth 401 collects at the bottom surface 514 of the water collection chamber 502. The water collection chamber 502 has a predetermined height. In some embodiments, the height of the water collection chamber 502 is greater than 5 centimeters.

The housing 402 also includes a water flow channel 504 at a lower end of the housing 402. More specifically, the water flow channel 504 may be positioned below the water collection chamber 502 in the housing 402. The water flow channel 504 fluidly connects the inlet port 404 and the outlet port 406. That is, the water flow channel 504 provides a passageway extending between the ports 404 and 406. For example, the water flow channel 504 may be an unfilled bore extending from the inlet port 404 to the outlet port 406.

In at least some embodiments, the water flow channel 504 includes one or more interior sidewalls 506 which define a partition 508 within the water flow channel. The sidewalls 506 extend internally between the walls of the water flow channel 504. The partition 508 divides the water flow channel 504 into two non-overlapping compartments and blocks the flow of water in the water flow channel 504. The partition 508 also defines an aperture 510. The aperture 510 allows for passage of water between the ports 404 and 406. That is, water flowing from the inlet port 404 towards the outlet port 406 passes through the aperture 510.

The housing 402 includes a stem 505. The stem 505 extends generally longitudinally from the water collection chamber 502 into the water flow channel 504 and through the aperture 510 in the partition 508. In particular, the bottom surface 514 of the water collection chamber 502 and top wall of the water flow channel 504 may each define an aperture through which the stem 505 can extend. The stem 505 may comprise one or more straight rod sections which are connected and movable relative to each other. For example, in at least some embodiments, the stem 505 may include a linkage section or a plurality of rigid links 520 connected at joints with rotary or linear bearings. As shown in FIG. 5, the links 520 may form an extendable chain. The links 520 may be used to restrict certain types of relative movements of sections of the stem 505. In particular, the linkage may comprise two or more links which can be aligned to lock in position with respect to each other. When the links are released from the locked position, the linkage may extend to lengthen the stem 505.

The stem 505 is coupled to a handle 410 and a disc 516. The handle 410 is attached to a first end of the stem 505 and the disc 516 is rigidly affixed to a second end of the stem 505. The stem 505 extends vertically into the water collection chamber 502 such that the first end of the stem 505 remains above the bottom surface 514 of the water collection chamber 502. In particular, the handle 410 is mounted to the stem 505 such that it is in spaced relation to the bottom surface 514. The handle 410 includes a knob portion and a grip bar. In some embodiments, the handle 410 may be attached to the stem 505 such that the knob portion of the handle 410 is generally perpendicular to the stem 505. Similarly, the disc 516 may be attached to the second end of the stem 505 such that the flat faces of the disc are perpendicular to the stem 505.

As water flows through the open top end of the housing 402, it is received and collected in the water collection chamber 502. The water shut-off device 400 may be adapted to use the water collecting in the water collection chamber 502 to automatically cause a shut-off of water flow between the ports 404 and 406. More specifically, the housing 402 includes a stem controller which uses the accumulated water to cause an upward movement of the stem 505 and move the disc 516 into position to block the flow of water between the inlet port 404 and the outlet port 406 in the water flow channel 504. In at least some embodiments, the upward movement of the stem 505 may bring the disc 516 into contact with the partition 508 to seal the aperture 510. Since water flowing between the ports 404 and 406 passes through the aperture 510, when the water shut-off device 400 is in an open configuration, the aperture 510 remains unobstructed. In particular, the disc 516 remains spaced apart from the partition 508. When the stem 505 is moved upward due to the water collecting in the water collection chamber 502, the stem 505 pulls the disc 516 towards the partition 508 until the disc 516 makes contact with the partition 508 and completely covers the aperture 510. The disc 516 has a greater cross-sectional area than the aperture 510 and is sized to cover the aperture 510, forming a leak-tight seal about the aperture 510.

In the water shut-off device 400, the stem controller for blocking the water flow channel 504 includes a buoyant float 512 that is mounted between the bottom end of the handle 410 and the bottom surface 514 of the water collection chamber 502. The float 512 is generally cylindrical. In at least some embodiments, the float 512 defines a central bore through which the stem 505 extends. In particular, the float 512 may be movable axially along the stem 505. When the water collection chamber 502 does not contain any water, the float 512 rests against the bottom surface 514. As water begins to accumulate in the water collection chamber 502, the rising level of water causes an upward displacement of the float 512. This displacement gradually brings the float 512 to push upward on the bottom end of the handle 410, moving the handle 410 and the stem 505 upward. As a result, the stem 505 brings the disc 516 towards the partition to close the aperture 510, as shown in FIG. 6.

One or more parameters of this mechanism for automatic valve shut-off can be manually set by using the handle 410. In at least some embodiments, the handle 410 may be adjusted to indicate an amount of water that should be received in the water collection chamber before the stem is displaced and water flow between the ports is blocked. For example, the handle 410 may be moved vertically upward or downward along the stem 505 to change a distance between the bottom end of the handle 410 and the bottom surface 514 of the water collection chamber 502. In some cases, turning the handle in a first direction may cause the handle to move upward while turning the handle in a second direction opposite to the first direction may cause the handle to move downward.

The handle 410 provides a convenient way to control the flow of water through the water shut-off device 400. In at least some embodiments, the handle 410 can be used to uncover the aperture 510, thereby permitting the flow of water through water flow channel 504. In the example of FIG. 5, the handle 410 may be pushed down, causing the disc 516 to be moved away from the aperture 510. This downward movement of the handle 410 may also cause a coiled spring 530 of the water shut-off device 400 to be compressed. The coiled spring 530 supports part of the stem 505 and exerts an upward force on the stem 505. As the float 512 gradually rises with the level of collected water in the water collection chamber 502, the float 512 pushes upward on the handle 410, until a sufficient amount of force allows the compressed spring to be released and extended to its natural length. The restoring force of the spring causes the stem 505, and consequently the disc 516, to move upward, sealing the aperture 510.

Figure 7:
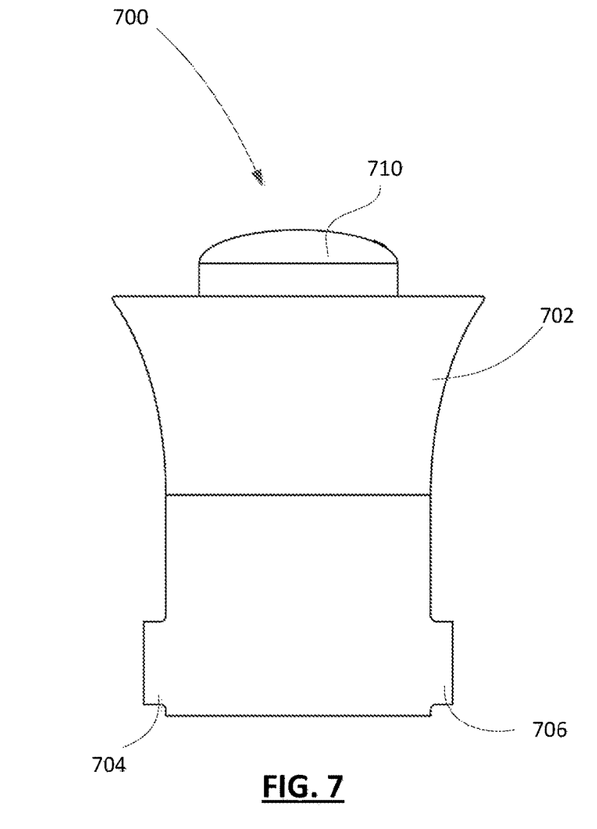
FIG. 7 shows a side view of another example water shut-off device.

Reference is now made to FIG. 7, which shows a side view of another example water shut-off device 700. The water shut-off device 700 includes a housing 702, an inlet port 704, an outlet port 706 and a handle 710 protruding from the top end of the housing 702. The housing 702 provides a fluid connection between the inlet port 704 and outlet port 706.

Figure 8:
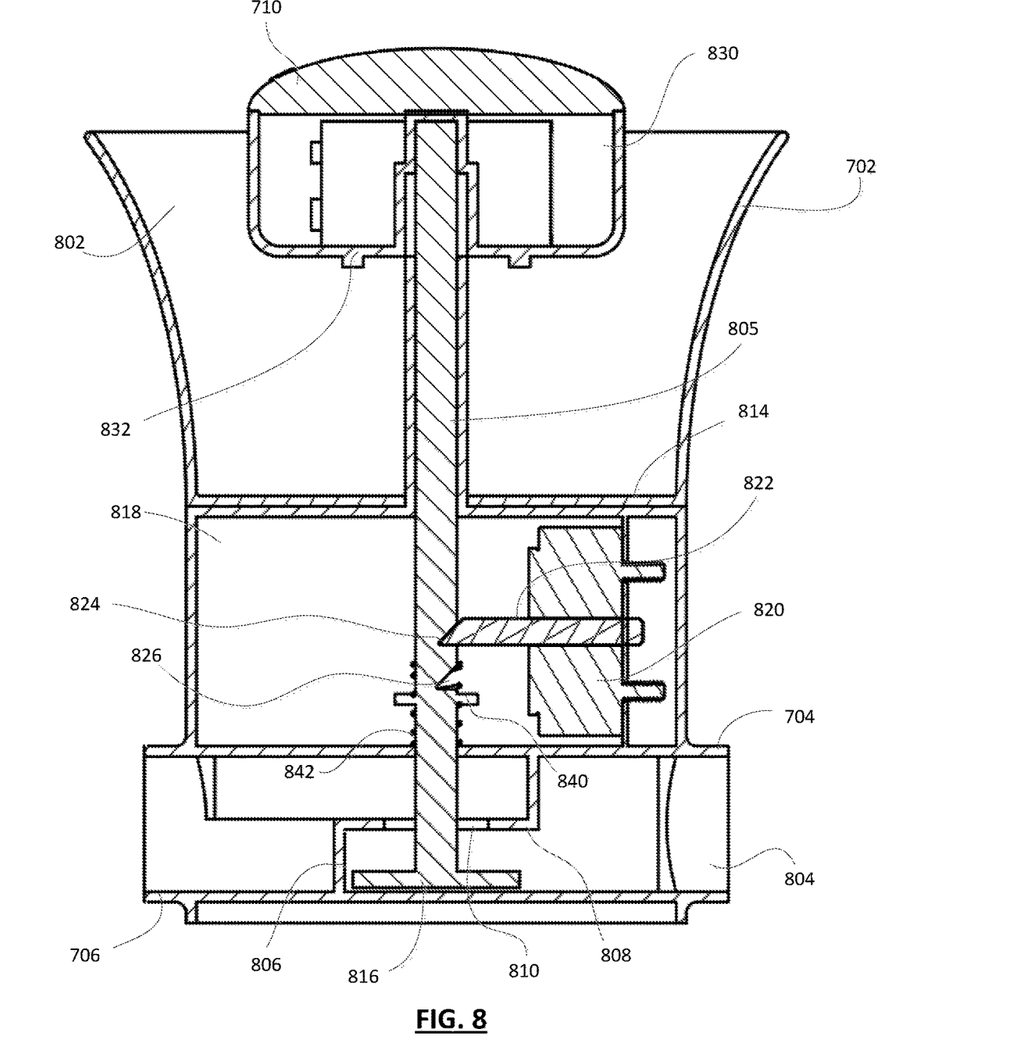
FIG. 8 shows a side cross-sectional view of the water shut-off device of FIG. 7 when the device is in an open configuration.

Similar to the water shut-off device 400 of FIG. 4, the water shut-off device 700, shown in FIG. 8, includes a water collection chamber 802 at an upper end of housing 702 and a water flow channel 804 at a lower end of the housing 702. The bottom surface 814 of the water collection chamber 802 is a horizontal partition dividing the housing into two vertically adjacent components. In particular, the housing 702 includes a lower compartment 818 which sits below the water collection chamber 802 and above the water flow channel 804. That is, the lower compartment 818 is enclosed by the water collection chamber 802 and the water flow channel 804. The water flow channel 804 fluidly connects the ports 704 and 706. The water flow channel 804 includes one or more interior sidewalls 806 defining a partition 808 within the water flow channel 804. The partition 808 defines an aperture 810 for allowing passage of water between the ports 704 and 706.

The housing 702 also includes a stem 805 which extends longitudinally from the water collection chamber 802, through the lower compartment 818 and into the water flow channel 804. The stem 805 also extends through the aperture 810 on the partition 808 in the water flow channel 804. The handle 710 is attached to a first end of the stem 805 and a disc 816 is rigidly affixed to a second, opposite end of the stem 805. The handle 710 is vertically separated from the bottom surface 814 of the water collection chamber 802.

The water shut-off device 700 operates by using water collected in the water collection chamber 802 to cause the stem 805 to be displaced upward, bringing the disc 816 to cover the aperture 810 and blocking the flow of water between the ports 704 and 706. Unlike the water shut-off device 400, the water shut-off device 700 uses various electronic components to implement an automatic shut-off process. The water shut-off device 700 includes a transducer 820 in the lower compartment 818. The transducer is mechanically coupled to a pin 822. The transducer 820 is configured to move the pin 822 between a retracted position and an extended position. The pin 822 is sized to fit and be retained in one or more notches defined on a surface of the stem 805. FIG. 8 shows a first notch 824 and a second notch 826 on the surface of the section of the stem 805 which is contained in the lower compartment 818. The first notch 824 is positioned vertically higher than the second notch 826 on the stem 805 and the notches are separated by a fixed distance. It will be appreciated that the stem 805 may define more than two vertically adjacent notches in some embodiments.

The handle 710 comprises a handle housing 830. The handle 710 includes one or more sensors 832 affixed to the bottom surface 833 of the handle housing 830. In some embodiments, the sensors 832 are distributed in spaced relation to each other on the bottom surface 833. The sensors 832 are electrically coupled to the transducer 820. For example, the sensors 832 may generate electrical signals that are processed by electronic components contained in the handle housing 830, and these electronic components may be connected to the transducer 820 via a wired connection. The electronic components housed in the handle housing 830 may include, among others, a printed circuit board (PCB) and one or more batteries. Similar to the handle 510 of the water shut-off device 400, the handle 710 can be pushed down to separate the disc 816 from the aperture 810.

Prior to the collection of water in the housing 702, the pin 822 is inserted into the first notch 824, preventing vertical movement of the stem 805. As water is collected, the water level in the water collection chamber 802 gradually rises. When the water level reaches the bottom surface 833 of the handle housing 830, the sensors 832 are configured to detect contact with the water and cause the transducer to move the pin 822 to the retracted position. That is, the transducer is caused to remove the pin from the first notch 824. As more water is collected in the water collection chamber 802, the collected water pushes upward on the bottom surface 833 of the handle housing 830 and causes the handle 710 to be displaced upward. When the handle 710 has been displaced by a distance equal to the distance between the first notch 824 and the second notch 826 on the stem 805, the transducer 820 causes the pin 822 to move to the extended position, inserting the pin into the second notch 826 to fit and be retained in the second notch 826. In some embodiments, the pin 822 may be inserted into the second notch 826 without actuation by the transducer 820. In particular, the pin 822 may exert a constant force on the wall of the stem 805 and spring back to the extended position when it aligns with the second notch 826.

Figure 9:
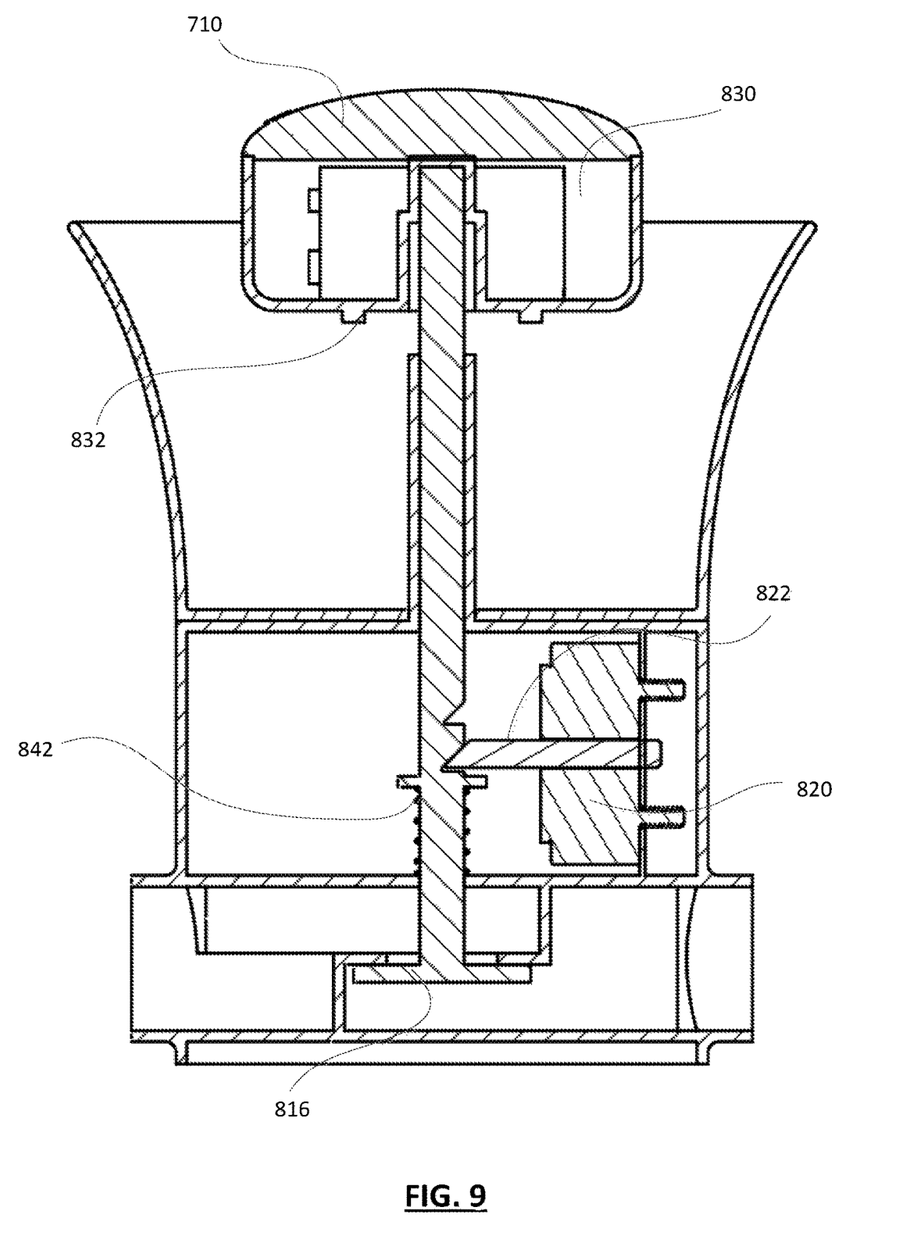
FIG. 9 shows a side cross-sectional view of the water shut-off device of FIG. 7 when the device is in a closed configuration.

The upward displacement of the handle 710 causes the stem 805 to pull the disc 816 towards the partition 808. When the pin 822 is inserted in the second notch 826, the disc 816 makes contact with the partition 808 and covers the aperture 810, blocking the flow of water between the ports 704 and 706 in the water flow channel 804, as shown in FIG. 9.

In some embodiments, the stem 805 may define a shoulder 840. For example, the shoulder 840 may be positioned vertically lower than the second notch 826 on the stem 805. The housing 702 may further include a coiled spring 842, which sits in the bottom surface of the lower compartment 818. When the handle 710 is pushed down, the coiled spring 842 may be caused to be compressed. Consequently, the coiled spring 842 may be configured to apply a constant upward force against the shoulder 840. In some embodiments, the removal of the pin 822 from the first notch 824 may cause the stem 805 to move upward as a result of the restoring force exerted by the coiled spring 842. That is, the upward movement of the stem 805 may be due to the force applied by the coiled spring 842. In particular, in some embodiments, the upward movement of the stem 805 may not be caused by a displacement of the handle 710 by additional collection of water in the water collection chamber 802 after removing the pin 822 from the first notch 824.

Certain adaptations and modifications of the described embodiments can be made. Therefore, the above discussed embodiments are considered to be illustrative and not restrictive.

The invention claimed is:

1. A water shut-off device having an inlet port and an outlet port, the device comprising:
   a housing which includes:
   a water collection chamber at an upper end of the housing for collecting water flowing through a first opening of the housing;
   a water flow channel at a lower end of the housing, the water flow channel fluidly connecting the inlet port and the outlet port;
   a stem extending longitudinally from the water collection chamber into the water flow channel, the stem having a handle at a first end and a disc at a second end; and
   a stem controller for using water that accumulates in the water collection chamber to cause an upward movement of the stem, moving the disc into position to block flow of water between the ports in the water flow channel,
   wherein the stem controller comprises a buoyant float mounted between the handle and a bottom surface of the water collection chamber, the buoyant float movable axially along the stem such that as water accumulates in the water collection chamber, an upward displacement of the float by the accumulated water causes the float to push upward on a bottom end of the handle to move the handle and the stem upward.

2. The water shut-off device of claim 1, wherein the water flow channel includes one or more interior sidewalls defining a partition within the water flow channel, the partition defining an aperture for allowing passage of water between the ports, and wherein the stem extends through the aperture in the partition.

3. The water shut-off device of claim 2, wherein the stem controller brings the disc into contact with the partition to seal the aperture.

4. The water shut-off device of claim 3, wherein the disc is sized to completely cover the aperture and form a leak-tight seal about the aperture.

5. The water shut-off device of claim 1, wherein the handle can be adjusted to indicate an amount of water to receive in the water collection chamber before the stem is displaced and water flow between the ports is blocked.

6. The water shut-off device of claim 5, wherein adjusting the handle comprises causing the handle to move vertically upward or downward to change a distance between the bottom end of the handle and the bottom surface of the water collection chamber.

7. The water shut-off device of claim 1, wherein a section of the stem includes a link of one or more joints.

8. The water shut-off device of claim 1, further comprising a coil spring, wherein the stem defines a shoulder and the coil spring is configured to apply an upward force on the shoulder.

* * * * *